Nov. 16, 1965   J. E. ADAMS   3,218,101

VEHICLE BODY VIBRATION INSULATING MOUNT

Filed April 19, 1963

INVENTOR.
JAMES E. ADAMS
BY
ATTORNEY

United States Patent Office 3,218,101
Patented Nov. 16, 1965

3,218,101
VEHICLE BODY VIBRATION
INSULATING MOUNT
James E. Adams, Toledo, Ohio, assignor, by mesne assignments, to The Bishop and Babcock Corporation, Toledo, Ohio, a corporation of Ohio
Filed Apr. 19, 1963, Ser. No. 274,078
4 Claims. (Cl. 296—35)

This invention relates to body mounts but particularly to a fastener assembly for attaching the vehicle body to the frame in such manner that the frame and body are insulated from each other to eliminate vibrational noises, and shocks ordinarily occasioned from metal to metal contact.

An object is to produce a new improved body mount of this character in which compressed rubber insulators are interposed between the body and frame parts and are retained under compression by retainer parts including a spring metal thimble part so constructed and arranged to enable other retainer members to telescope with each other but prevent retrograde separational movement after the desired compression of the insulators has been effected.

Other objects and advantages of the invention will hereinafter appear and, for purposes of illustration but not of limitation, an embodiment of the invention is shown on the accompanying drawings in which—

Figure 1:
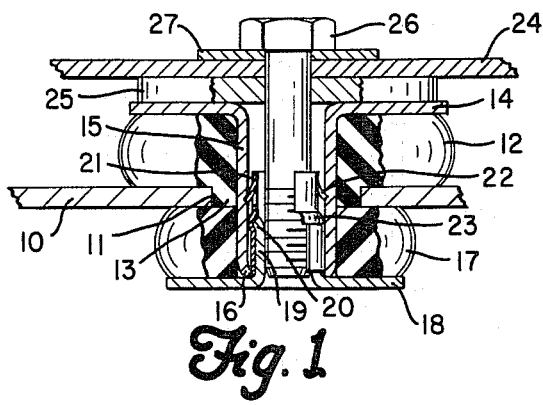
FIGURE 1 is a view partly in horizontal section and partly in elevation showing a body mount fastener assembly connecting a vehicle body panel to a vehicle frame, these parts being shown in section.

The illustrated embodiment of the invention comprises a motor vehicle frame 10 having an aperture 11. A compressible rubber spacer or insulator 12 bears against the upper surface of the frame part 10 and has an axial extension 13 which extends into the aperture 11 as indicated. It will be noted that the insulator 12 is in the form of an annulus, thereby providing a central or axial opening. Bearing against the upper face of the rubber annulus 12 is a flat flange 14 which has an integral elongate sleeve 15 which bears against the inside of the annulus 12 and is of sufficient length to extend through the hole 11 in the vehicle frame part 10. On the free end of the sleeve 15 is an inwardly extending lip 16.

Bearing against the under side of the frame part 10 is a somewhat thinner compressible insulator or annulus 17. Bearing against the outer face of the annulus or insulator 17 is a flat flange 18. Integral with the flange 18 is an integral upwardly extending sleeve 19 which loosely telescopes with the sleeve 15 and in such manner that space exists between the adjacent walls of these sleeves. The upwardly extending sleeve 19 is relatively short and projects only a short distance inside the sleeve 15. On the upper end of the sleeve 19 is an outwardly extending annular lip 20. The sleeve 19 is formed with internal screw threads for a purpose which will hereinafter fully be described.

Figure 2:
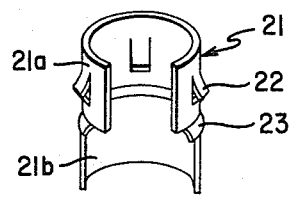
FIGURE 2 is a perspective view of the spring clip or thimble forming a part of the body mount assembly shown in FIGURE 1.

As shown in FIGURES 1 and 2, there is a split retainer sleeve or spring clip 21 interposed between the telescoping sleeves 15 and 19. The sleeve 21 is of spring metal and is of somewhat greater diameter than the space provided for it so that the clip must be somewhat compressed together in order for it to fit into the space between the two sleeves. It will be noted that the clip 21 has an upward section 21a which is formed with a series of outwardly struck detent tongues 22 which incline downwardly and outwardly. Integrally connected to the upper section 21a by an outwardly extending annular shoulder bead 23 is a lower section 21b. The lower section 21b is of somewhat greater diameter than that of the upper section 21a. It will be noted that the lower edge of the section 21b abuts against the inwardly extending lip 16. The spring tongues 22 impinge against the inner wall of the sleeve 15 and resist upward movement of the clip 21.

It is manifest that when pressure is exerted on the flanges 14 and 18 in order to place the rubber insulators 12 and 17 under compression, the spring tongues 22 assist in preventing retrograde or separational movement of the two sleeves. The abutting engagement between the shoulder bead 23 and the outwardly extending lip 20, as well as the engagement between the lower edge of the clip section 21b and the inwardly extending lip 16, cooperate to hold the parts in position after the rubber annuli have been compressed to the desired degree.

Spaced above the vehicle frame part 10 is the vehicle body panel 24 which it is desired to connect to frame 10. In order to compensate for irregularities and to effect body leveling, an apertured spacer disc 25 is interposed between the under side of the body panel 24 and the top face of the flange 14. A bolt 26 having a washer 27 extends through an opening in the body panel 24, through the spacer disc 25 and into threaded engagement with the threads on the inside of the sleeve 19. Thus, after the rubber insulators 12 and 17 have been compressed, and the parts retained in their desired degree of compression, then the body panel 24 is applied and, by means of the bolt 26, the parts are connected together in the manner described. It will be understood that a number of these assemblies are required for properly connecting the vehicle body panel to the frame 10.

Figure 3:
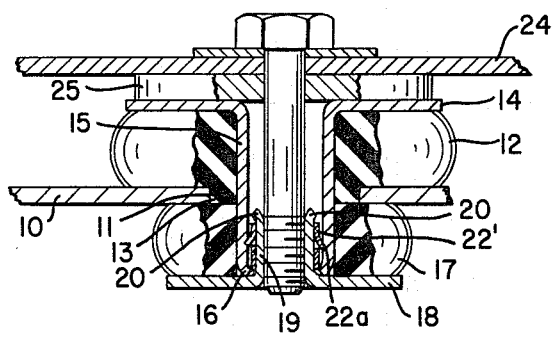
FIGURE 3 is a view partly in horizontal section and partly in elevation of an alternate form of body mount assembly.
Figure 4:
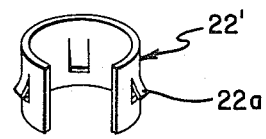
FIGURE 4 is a perspective view of the clip or thimble used in the assembly shown on FIGURE 3.

The fastener shown in FIGURES 3 and 4 is similar to that above described except that the retainer clip 22' is considerably shorter and is of such length as to be wholly confined in the space between the lips 16 and 20. As shown the clip 22' is provided with spring detent tongues 22a which serve the same purpose as the tongues 22 above described.

From the above description it will be apparent that a body panel can be easily connected to the vehicle frame in such manner as to be insulated against vibrational noises and shocks. By employing a spring clip as above described, it will be apparent that after pressure has been applied against the flanges 14 and 18 to compress the rubber insulators, the latter will be retained in compressed condition due to the structure and arrangement of the parts and the cooperation of the spring clip.

Numerous changes in details of construction, arrangement and choice of materials may be effected without departing from the spirit of the invention, especially as defined in the appended claims.

What I claim is:

1. In a body mount for connecting vehicle frame and body parts in which the frame has a hole and rubber insulators or annuli are arranged on opposite sides of the frame with an axial portion thereof projecting into said hole and a pair of loosely telescoping tubes are arranged coaxially of the insulators and have flanges at their outer ends respectively to bear against the outer faces of the insulators, the improvement which comprises an inwardly extending lip on the free end of the outer of said telescoping tubes, an outwardly extending lip on the free end of the inner of said telescoping tubes, a split, cylindrical, resiliently expansible clip embracing the inner telescoping tube and having portions respectively abutting said lips, and outwardly inclined tongues on said clip to impinge on the inner wall of the outer telescoping tube.

2. The organization as claimed in claim 1 which comprises an outwardly extending bead on said clip fitting over the outwardly extending lip to provide an abutting shoulder.

3. The organization as claimed in claim 1 in which the spring clip has a lower and upper section, an integral outwardly extending bead connecting said sections and fitting the outwardly extending lip, the upper section being of smaller diameter than the lower section and the inclined tongues being struck from the upper section.

4. The organization as claimed in claim 1 in which the spring clip is wholly contained in the space between the inwardly extending and outwardly extending lips.

References Cited by the Examiner
UNITED STATES PATENTS

| 2,005,103 | 6/1935 | Moorhouse | 296—35 |
| 2,425,654 | 8/1947 | Storch | 248—22 X |
| 3,112,950 | 12/1963 | Jaskowiak | 296—35 |

FOREIGN PATENTS

| 1,260,978 | 4/1961 | France. |

BENJAMIN HERSH, *Primary Examiner.*